US010045257B2

(12) United States Patent
Zhu et al.

(10) Patent No.: US 10,045,257 B2
(45) Date of Patent: Aug. 7, 2018

(54) DEVICES FOR PACKET SYSTEM BEARER SPLITTING

(71) Applicant: Intel Corporation, Santa Clara, CA (US)

(72) Inventors: Jing Zhu, Portland, OR (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/121,709

(22) PCT Filed: Jul. 7, 2015

(86) PCT No.: PCT/US2015/039330
§ 371 (c)(1),
(2) Date: Aug. 25, 2016

(87) PCT Pub. No.: WO2016/007478
PCT Pub. Date: Jan. 14, 2016

(65) Prior Publication Data
US 2016/0366613 A1    Dec. 15, 2016

Related U.S. Application Data

(60) Provisional application No. 62/022,055, filed on Jul. 8, 2014.

(51) Int. Cl.
*H04W 28/06* (2009.01)
*H04W 76/40* (2018.01)
(Continued)

(52) U.S. Cl.
CPC .......... *H04W 28/065* (2013.01); *H04L 47/34* (2013.01); *H04L 61/6086* (2013.01); *H04W 28/08* (2013.01); *H04W 76/40* (2018.02)

(58) Field of Classification Search
None
See application file for complete search history.

(56) References Cited

U.S. PATENT DOCUMENTS

| 6,603,769 B1 * | 8/2003 | Thubert | H04L 45/04 370/389 |
| 2007/0064715 A1 * | 3/2007 | Lloyd | H04L 41/0816 370/401 |

(Continued)

FOREIGN PATENT DOCUMENTS

| CN | 106664601 | 5/2017 |
| EP | 2651178 | 10/2013 |

(Continued)

OTHER PUBLICATIONS

"International Application Serial No. PCT/US2015/039330, International Search Report dated Oct. 27, 2015", 3 pgs.
"International Application Serial No. PCT/US2015/039330, Written Opinion dated Oct. 27, 2015", 7 pgs.
"International Application Serial No. PCT/US2015/039330, International Preliminary Report on Patentability dated Jan. 19, 2017", 9 pgs.

(Continued)

*Primary Examiner* — Diane Lo
(74) *Attorney, Agent, or Firm* — Schwegman Lundberg & Woessner, P.A.

(57) ABSTRACT

A communication device comprises physical layer circuitry configured to transmit and receive radio frequency electrical signals to communicate directly with one or more separate wireless devices via a cellular network and a non-cellular network; and processing circuitry configured to: initiate transmission of a packetized message using a non-cellular communication channel and a cellular communication channel, wherein the packetized message includes a plurality of internet protocol (IP) packets; indicate in an IP header field of an IP packet of the plurality of IP packets that the IP packet includes a packet sequence number; and include packet sequence numbers in the IP packets.

24 Claims, 11 Drawing Sheets

(51) Int. Cl.
  *H04W 28/08*  (2009.01)
  *H04L 12/801* (2013.01)
  *H04L 29/12*  (2006.01)

(56) References Cited

U.S. PATENT DOCUMENTS

| | | | | |
|---|---|---|---|---|
| 2013/0170474 A1* | 7/2013 | Bi | .................... | H04W 36/0055 370/332 |
| 2013/0176988 A1* | 7/2013 | Wang | .................... | H04W 28/08 370/331 |
| 2017/0245252 A1* | 8/2017 | Gao | .................... | H04W 72/042 |

FOREIGN PATENT DOCUMENTS

| | | | |
|---|---|---|---|
| JP | 05191434 | A | 7/1993 |
| JP | 2000224261 | A | 8/2000 |
| JP | 2000341333 | A | 12/2000 |
| JP | 2002232436 | A | 8/2002 |
| JP | 2009531911 | A | 9/2009 |
| JP | 2009296084 | A | 12/2009 |
| JP | 2011061253 | A | 3/2011 |
| JP | 2012157037 | A | 8/2012 |
| JP | 2013520096 | A | 5/2013 |
| JP | 2014027548 | A | 2/2014 |
| JP | 2017520166 | A | 7/2017 |
| WO | 02098105 | | 12/2002 |
| WO | 2011100492 | | 8/2011 |
| WO | WO-201100492 | A1 | 8/2011 |
| WO | 2013068787 | | 5/2013 |
| WO | 2014056130 | | 4/2014 |
| WO | WO-2014047939 | A1 | 4/2014 |
| WO | WO-2014056130 | A1 | 4/2014 |
| WO | 2016007478 | | 1/2016 |
| WO | WO-2016007478 | A1 | 1/2016 |

OTHER PUBLICATIONS

Ericsson, "PDCP reordering for split bearer in dual connectivity", R2-142400, 3GPP TSG RAN WG2 Meeting #86, Seoul, South Korea, [Online]. Retrieved from the Internet: http://www.3gpp.org/ftp/tsg_ran/WG2_RL2/TSGR2_86/docs/, (May 9, 2014).

Huawei, "PDCP reordering operation after split bearer release", R2-142059, 3GPP TSG RAN WG2 Meeting #86, Seoul, South Korea, [Online]. Retrieved from the Internet: http://www.3gpp.org/ftp/tsg_ran/WG2_RL2/TSGR2_86/docs/, (May 10, 2014).

Intel, Corporation, "PDCP reordering for split bearer", R2-142039, 3GPP TSGRAN WG2 Meeting #86, Seoul, South Korea, [Online]. Retrieved from the Internet: http://www.3gpp.org/ftp/tsg_ran/WG2_RL2/TSGR2_86/docs/, (May 10, 2014).

Ericsson, "PDCP reordering for split bearer in dual connectivity", R2-142400, 3GPP TSG RAN WG2 Meeting #86, Seoul, South Korea, [Online]. Retrieved from the Internet: <http://www.3gpp.org/ftp/tsg_ran/WG2_RL2/TSGR2_86/docs/>, (May 9, 2014).

Huawei, et al., "PDCP reordering operation after split bearer release", R2-142059, 3GPP TSG RAN WG2 Meeting #86, Seoul, South Korea, [Online]. Retrieved from the Internet: <http://www.3gpp.org/ftp/tsg_ran/WG2_RL2/TSGR2_86/docs/>, (May 10, 2014).

Intel, Corporation, "PDCP reordering for split bearer", R2-142039, 3GPP TSG RAN WG2 Meeting #86, Seoul, South Korea, [Online]. Retrieved from the Internet: <http://www.3gpp.org/ftp/tsg_ran/WG2_RL2/TSGR2_86/docs/>, (May 10, 2014).

"Japanese Application Serial No. 2016-569424, Office Action dated Jan. 16, 2018", W/ English Translation, 7 pgs.

"European Application Serial No. 15818190.9, Extended European Search Report dated Jan. 29, 2018", 5 pgs.

* cited by examiner

DEVICES FOR PACKET SYSTEM BEARER SPLITTING

PRIORITY APPLICATION

This application is a U.S. National Stage Filing under 35U.S.C. 371 from International Application No. PCT/US2015/039330, Filed Jul. 7, 2015, which application claims the benefit of priority to U.S. Provisional Application Serial No. 62/022,055, filed Jul. 8, 2014, which applications are incorporated herein by reference in their entirety.

TECHNICAL FIELD

Embodiments pertain to transmitting packetized data using radio access networks. Some embodiments relate to communicating cellular network data using a communication spectrum unlicensed to the type of cellular device used to communicate the information.

BACKGROUND

Radio access networks are used for delivering one or more of data communications, voice communications, and video communications to user equipment such as a cellular telephone or a smart phone. Some radio networks are packet switched networks and packetize information such as voice and video data when it is sent over the network. As the demand for communicating voice and video increases, quality of service can deteriorate as the radio access networks approach their peak capacity. Thus, there are general needs for devices, systems and methods that provide a robust protocol for communication with user equipment.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
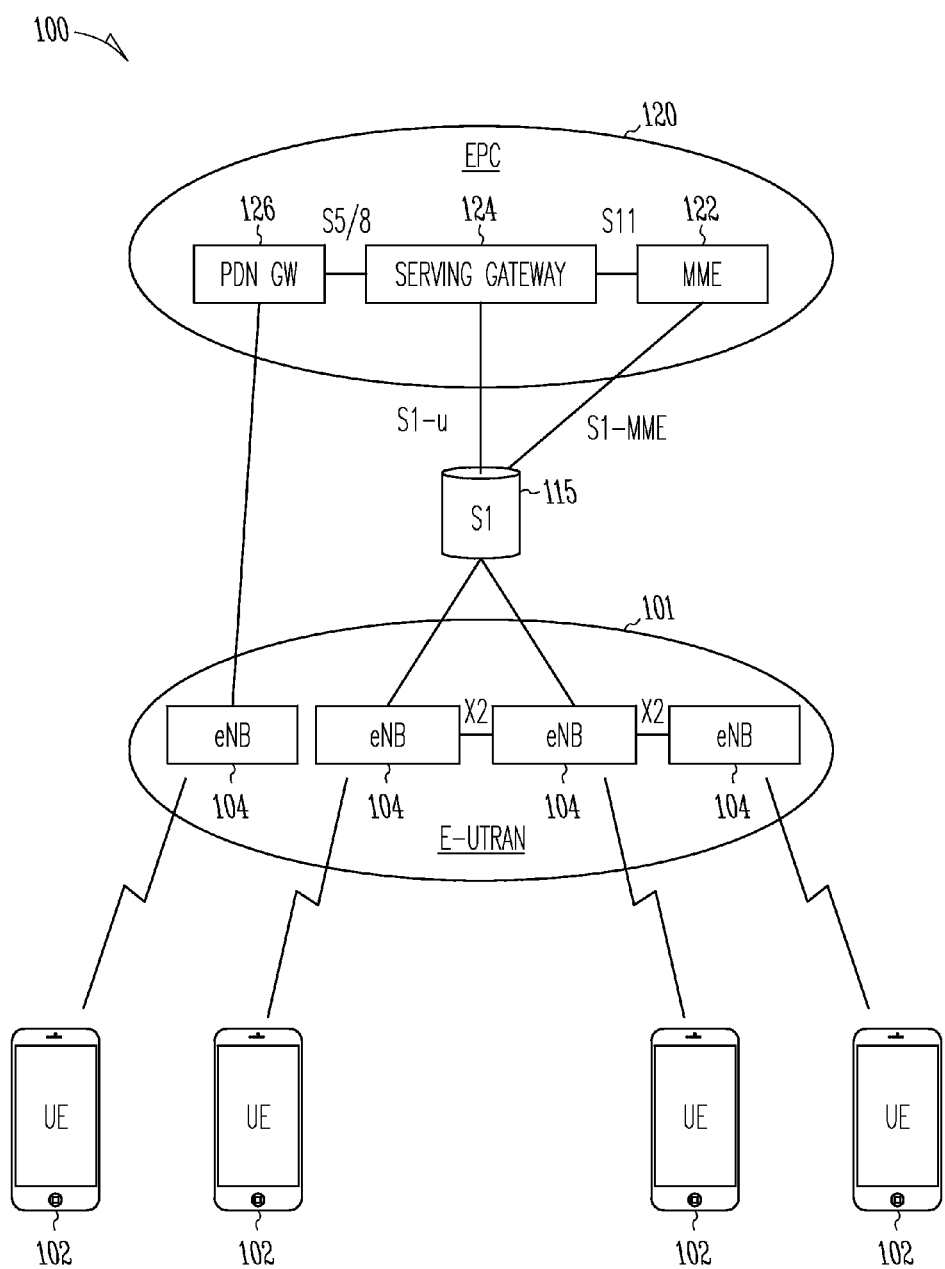
FIG. 1 is an example of a portion of an end-to-end network architecture of an LTE network with various components of the network in accordance with some embodiments.

FIG. 1 shows an example of a portion of an end-to-end network architecture of a third generation partnership project (3GPP) long term evolution (LTE) cellular network with various components of the network in accordance with some embodiments. The network 100 comprises a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102.

The MME 122 is similar in function to the control plane of legacy Serving GPRS Support Nodes (SGSN). The MME manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 101 and the EPC 120. The S1 is split into two parts: the S1-U, which carries traffic data between the eNBs 104 and the serving GW 124, and the S1-MME, which is a signaling interface between the eNBs 104 and the MME 122. The S11 interface is the interface between the serving GW and the MME 122. The S5 or S8 interface is the interface between the serving GW 124 and the PDN GW 126. The X2 interface is the interface between eNBs 104. The X2 interface comprises two parts, the X2-C and X2-U. The X2-C is the control plane interface between the eNBs 104, while the X2-U is the user plane interface between the eNBs 104.

The UEs 102 may include physical layer (PHY) circuitry for transmitting and receiving signals to and from eNBs. The UEs 102 may also include medium access control layer (MAC) circuitry for controlling access to the wireless medium. The UEs 102 communicate with the eNBs according to a radio protocol. A UE 102 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. A UE may include one or more of a keyboard, a display, a non-volatile memory port, multiple antennas, a graphics processor, an application processor, speakers, and other mobile device elements. The display may be an LCD screen including a touch screen.

Figure 2:
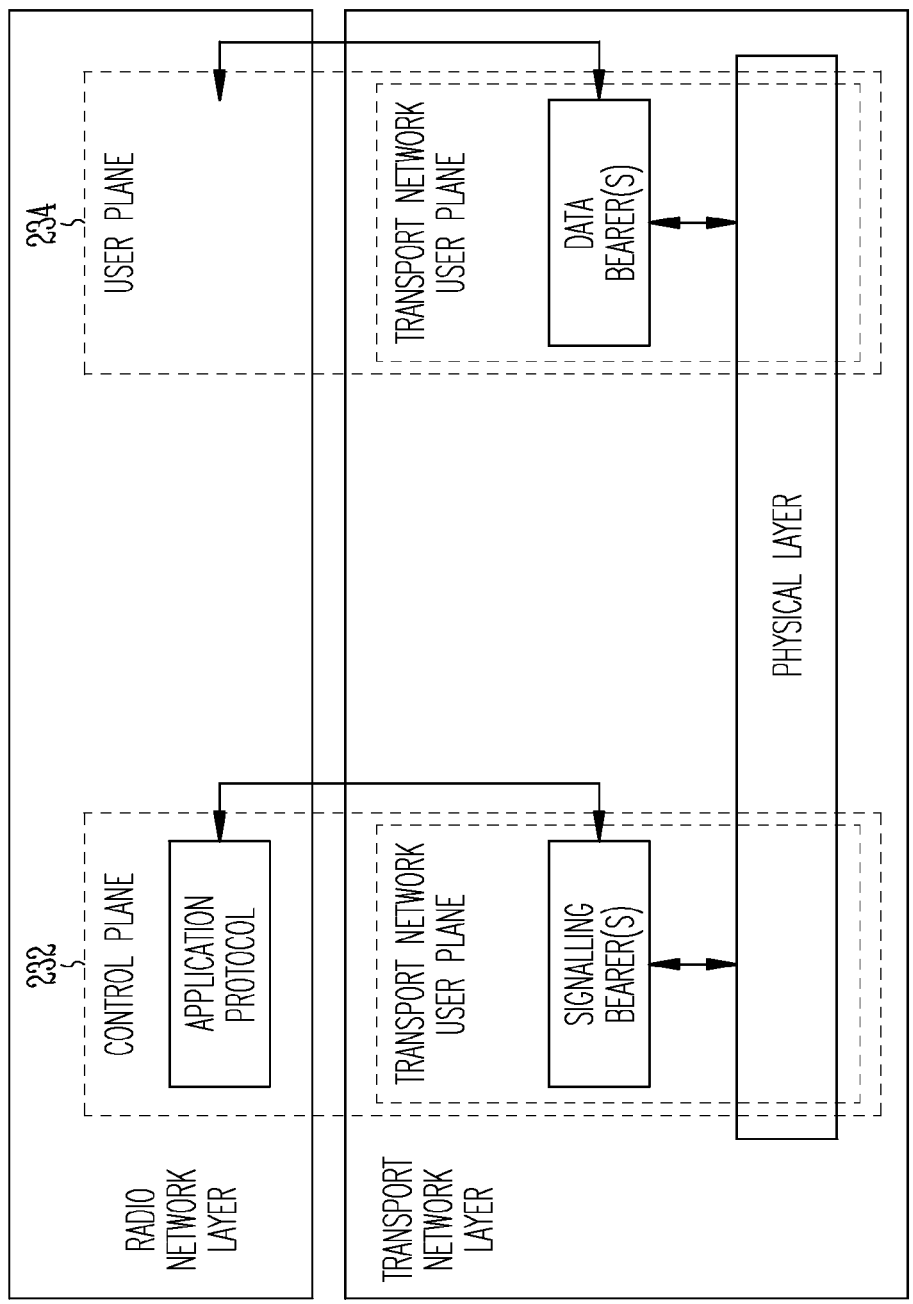
FIG. 2 is a block diagram of an example of a protocol communication architecture in accordance with some embodiments.

FIG. 2 is a block diagram of an example of a protocol communication architecture for devices of an LTE network. The protocol stack includes a control plane 232 and a user plane 234 or u-plane. At the control plane 232, a radio resource control (RRC) protocol creates signaling message communicated between the eNBs and the UEs. At the u-plane, data packets may be created and processed according to an internet protocol (IP).

Figure 3:
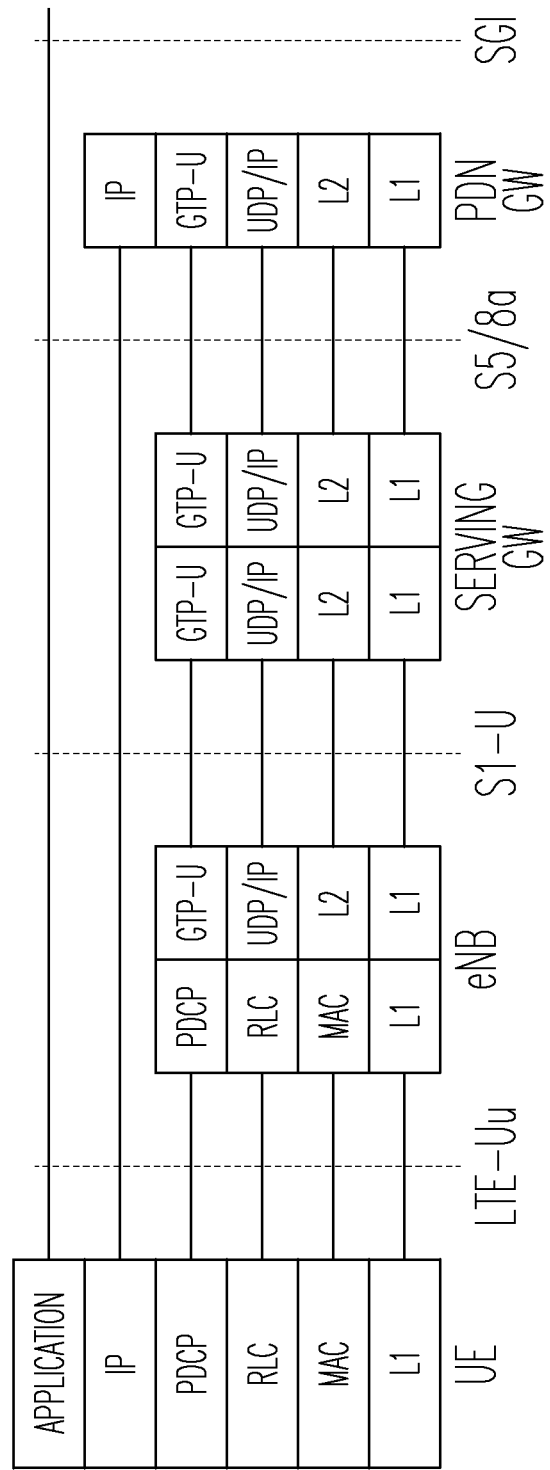
FIG. 3 is diagram of an example of a third generation partnership project (3GPP) cellular user-plane protocol stack in accordance with some embodiments.

FIG. 3 is diagram of an example of a cellular u-plane protocol stack. The layers of the protocol stack include a packet data convergence protocol (PDCP) layer, a radio link control (RLC) protocol layer, and a MAC protocol layer. IP packets are processed from the top layer to the bottom layer of the protocol stack. Information processed using the layers may be passed to the PHY circuitry for transmission. In the EPC 120 of FIG. 1, packets are encapsulated in a specific EPC protocol and tunneled between the PDN GW 126 and the eNBs 104. A general packet radio service (GPRS) tunneling protocol (GTP) may be used on the S1 interface between the eNBs 104 and the serving GW 124, and may also be used on the S5/8 interface between the PDN GW 126 and the serving GW 124. Different protocols may be used depending on the interface.

As explained previously, the demand for the wireless communication of voice data, video data, and other data continues to increase. A RAN 101 may experience heavy communication traffic which can lead to adverse network effects such as communication latency for example. To alleviate network traffic, non-cellular (e.g., Wi-Fi) network capacity can be added by providing communication capability to the RAN devices from networks that operate using a communication spectrum not licensed for use by the cellular network devices. For example, communication peaks may occur locally and the RAN serving the locality may experience peak demand The locality may include a Wi-Fi network (e.g., a wireless local area network or WLAN) for computing devices such as laptop computers and computer tablets, but the wireless cellular devices are not licensed to operate in the Wi-Fi communication spectrum (e.g., communication channels of 2.4 gigahertz (GHz) or 5 GHz).

According to some embodiments, the wireless cellular devices of a RAN (e.g., an LTE network) communicate information using the available Wi-Fi communication spectrum. To increase the communication bandwidth, a cellular network may use carrier or link aggregation. In link aggregation, more than one carrier or channel is used by a cellular device during a communication session. In some embodiments, the wireless cellular devices aggregate a cellular channel and a non-cellular (e.g., Wi-Fi) channel during a communication session. In some embodiments, the wireless cellular devices seamlessly switch between the cellular channel and the non-cellular channel during a communication session.

Figure 4:
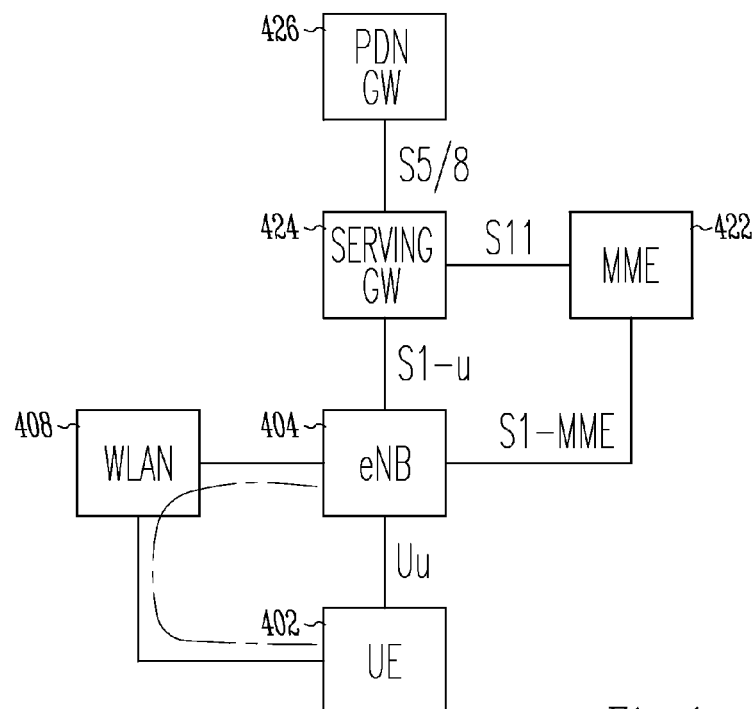
FIG. 4 is a block diagram of another example of an end-to-end 3GPP cellular network architecture in accordance with some embodiments.

FIG. 4 is a block diagram of another example of an end-to-end network architecture. The network architecture is similar to the example of FIG. 1, but also includes wireless local area network node (WLAN) 408. The UEs 402 can communicate with one or both of the eNBs 404 (via the cellular link Uu) and the WLANs 408. The WLANs can communicate with both the UEs and the eNBs. The WLAN 408 may be an access point (AP) for the UE 402. The architecture can be referred to as RAN-based because the eNB of the RAN acts as the mobility anchor for the combined cellular/Wi-Fi network. The aggregation of cellular/Wi-Fi channels is transparent to the core network elements (e.g., the serving GW 424, the PDN GW 426, and the MME 422).

Figure 5:
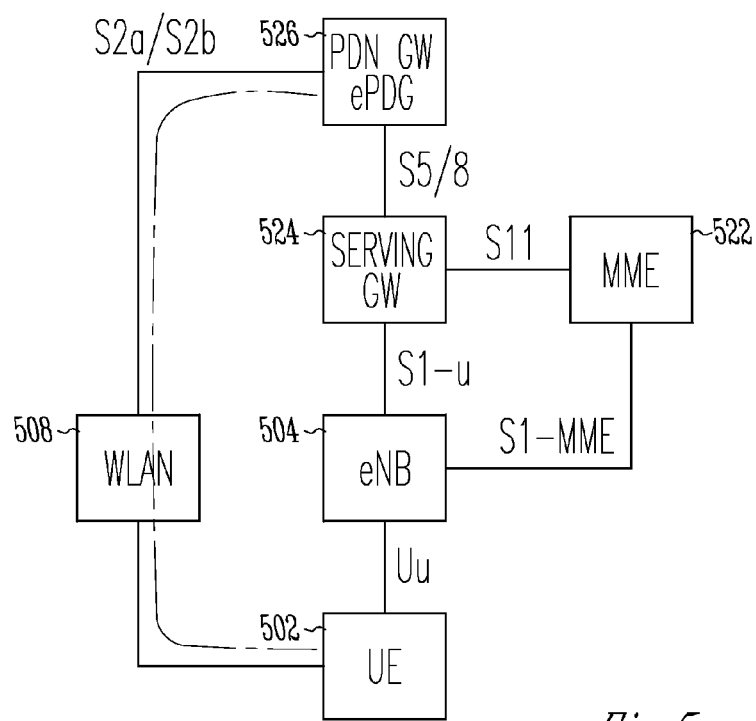
FIG. 5 is a block diagram of another example of end-to-end 3GPP cellular network architecture in accordance with some embodiments.

FIG. 5 is a block diagram of another example of end-to-end network architecture. In this example, the UEs can communicate with the PDN GW 526 (evolved packet data gateway, or ePDG) via WLAN 508 and eNB 504. The architecture can be referred to as core-based because the PDN GW 526 of the RAN acts as the mobility anchor for the combined cellular/Wi-Fi network. In this example, the cellular/Wi-Fi channel aggregation is managed using explicit message exchanges among the PDN GW 526, the serving GW 524, the MME 522, the eNBs 504, and the UEs 502.

Figure 6:
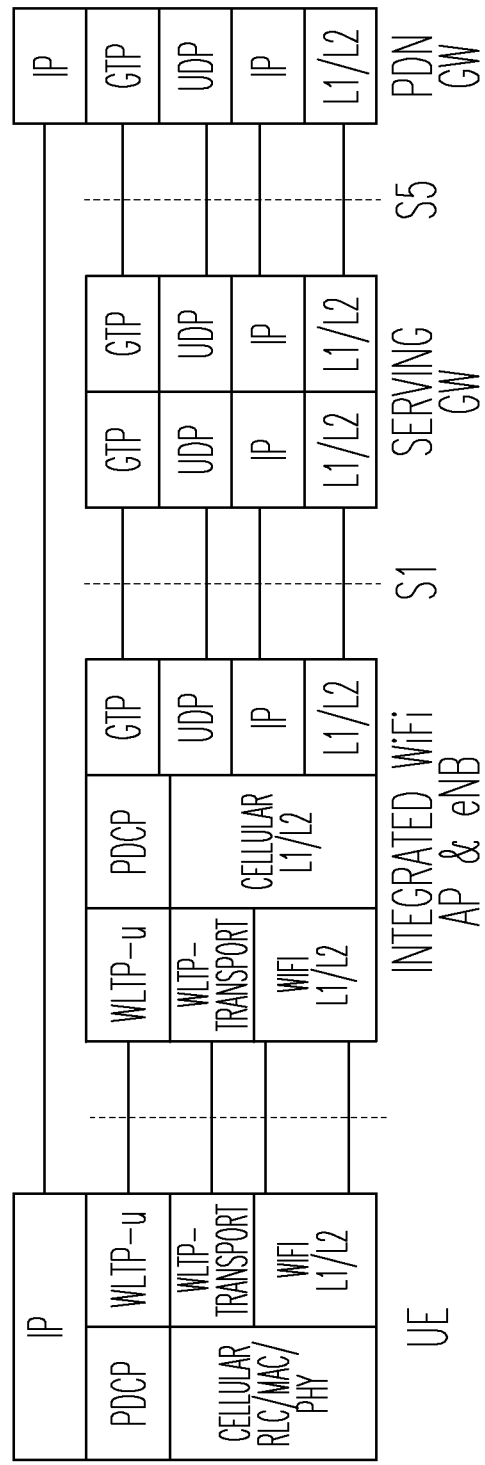
FIG. 6 is a diagram of another example of a 3GPP cellular user-plane protocol stack in accordance with some embodiments.

FIG. 6 is a diagram of another example of a u-plane protocol stack. A Wi-Fi protocol column that includes a WLAN tunneling protocol (WLTP) layer is added to the u-plane protocol stack of the example of FIG. 3. In an evolved packet system (EPS), an EPS bearer is a virtual connection between two points in the system. A single EPS bearer is provided using either the Wi-Fi link or the cellular link. The link for the EPS bearer may change between the Wi-Fi link and the cellular link during a single communication session. This can be referred to as bearer mobility, and some communication for the cellular network can be offloaded onto the Wi-Fi link.

An improvement over bearer mobility is to allow the EPS bearer to be split between the cellular link and the Wi-Fi link. This means that packets of a single communication can be transmitted over a split EPS bearer using both the cellular link and the Wi-Fi link, with some packets transmit over the cellular link and some packets transmitted over the Wi-Fi link. However, as shown in the examples of FIGS. 2 and 3 the packets may take different paths if a split EPS bearer is used. For example, some packets sent by a UE may take a path that includes a WLAN path and some packets may take a path that includes an eNB. The different paths may result in the packets may arriving out of order at the destination, and the packets may need to be re-ordered at the destination. Also, any change to the u-plane protocol stack to implement EPS bearer splitting should be compatible with present systems. It is also preferable if the change to the u-plane protocol stack is compatible with both a RAN-based network architecture (FIG. 4) and a core-based network architecture (FIG. 5).

Figure 7:
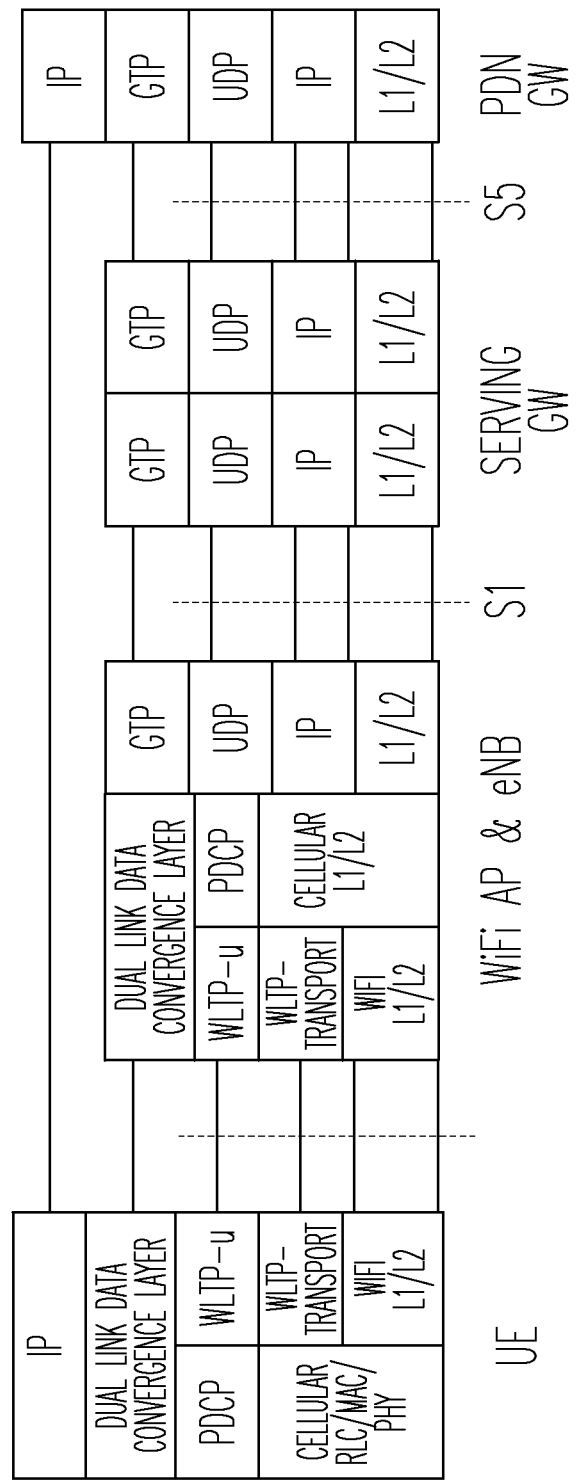
FIG. 7 is a diagram of still another example of a 3GPP cellular user-plane protocol stack in accordance with some embodiments.

FIG. 7 is a diagram of another example of a u-plane protocol stack. A new protocol layer, a Dual Link Data Convergence (DLDC) is inserted below the IP layer and above the PDCP/WLTP layer. This layer may be used to handle operations associated with EPS bearer splitting such as, among other things, splitting communications among the links, re-ordering communications, and re-transmission of communications. A sequence number is a per-packet control parameter used for bearer splitting. The sequence number indicates the place in the original transmission where the individual packet belongs. The receiving device can then re-order packets that arrive out of order into the correct order and deliver the packets in-order to higher layer protocols (e.g., IP, transmission control protocol (TCP), user datagram protocol (UDP), etc.). The example shown in FIG. 7 is an example of adding the DLDC layer to a u-plane protocol stack for a RAN-based Wi-Fi/RAN (e.g., 3GPP RAN) integrated network.

Figure 8:
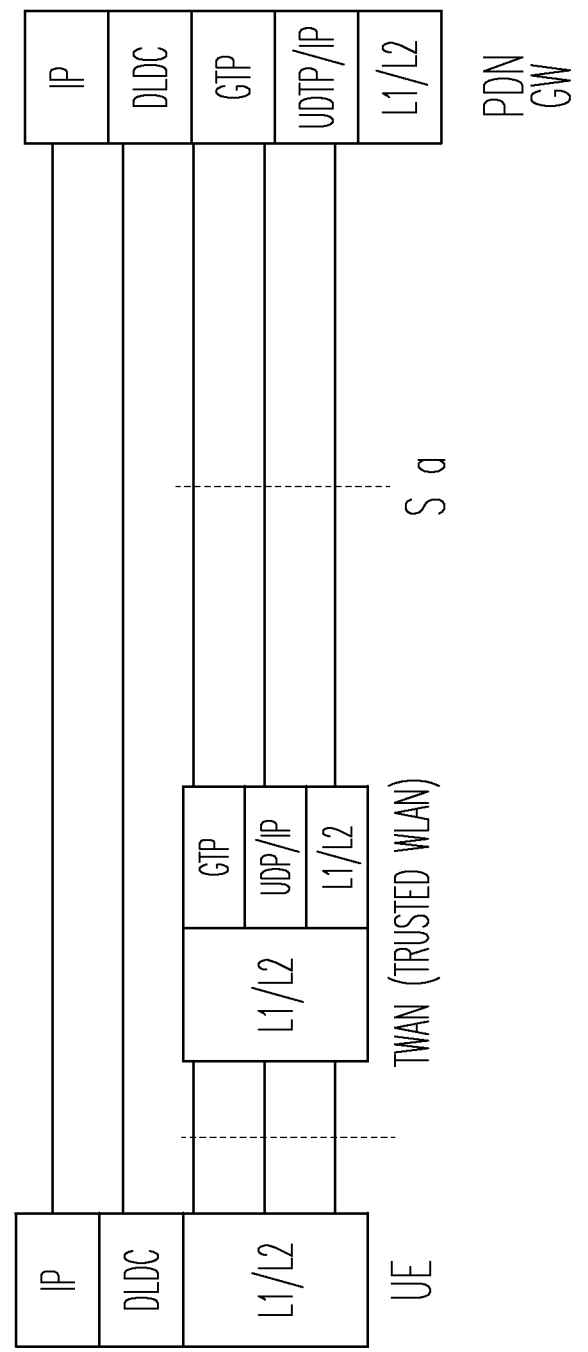
FIG. 8 is a diagram of still another example of a 3GPP cellular user-plane protocol stack in accordance with some embodiments.
Figure 9:
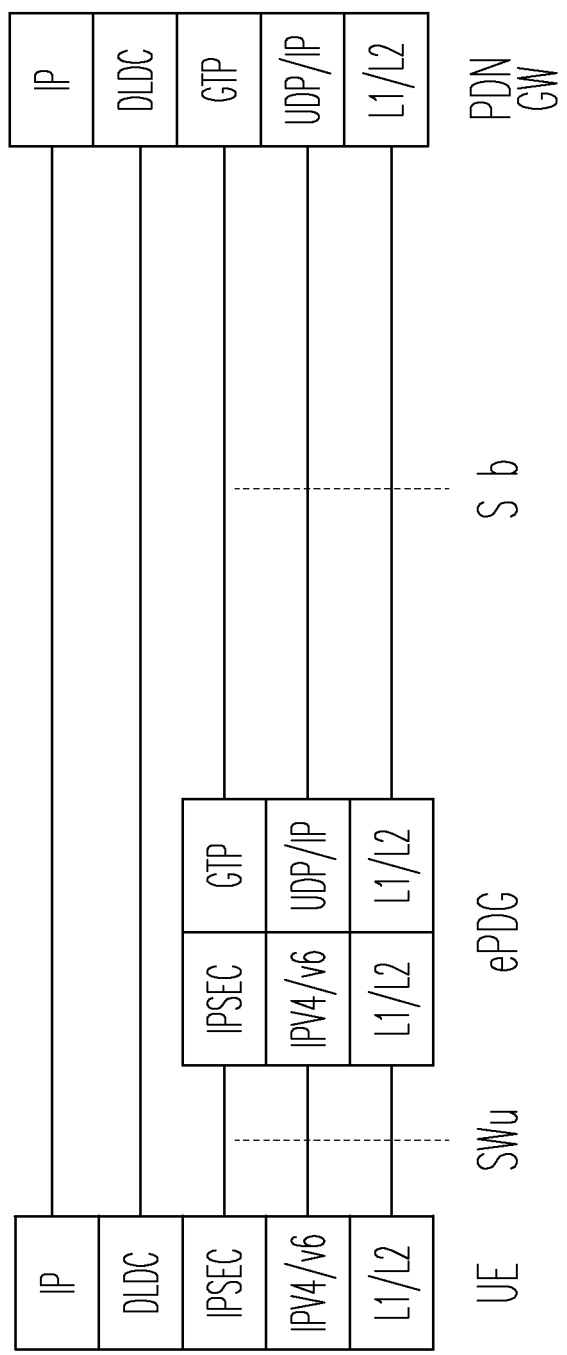
FIG. 9 is a diagram of still another example of a 3GPP cellular user-plane protocol stack in accordance with some embodiments.

FIG. 8 is a diagram of another example of a u-plane protocol stack. This example shows the DLDC layer added to a protocol stack for a core-based network (e.g., a trusted non-3GPP RAN). The DLDC layer is shown inserted below the IP layer and above (Cellular and WLAN) Layer 1 (L1) or Layer 2 (L2). FIG. 9 is a diagram of another example of a u-plane protocol stack for a core-based network (e.g., an un-trusted non-3GPP RAN). The DLDC layer is shown inserted below the IP layer and above an IP security (IPSec) layer.

Figure 10:
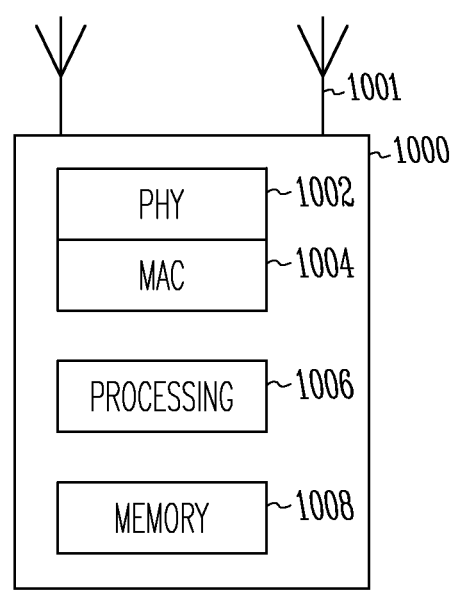
FIG. 10 is a block diagram of a wireless cellular communication device in accordance with some embodiments.

FIG. 10 is a block diagram of a wireless cellular communication device in accordance with some embodiments. The communication device 1000 may be any of the UEs 102 illustrated in FIG. 1, or the communication device may be any of the eNBs 104 of FIG. 1. The communication device 1000 may include PHY circuitry 1002 for transmitting and receiving radio frequency electrical signals using one or more antennas 1001 electrically connected to the PHY circuitry. The PHY circuitry 1002 may include circuitry for modulation/demodulation, upconversion/downconversion, filtering, amplification, etc. Communication device 1000 may also include MAC circuitry 1004 for controlling access to the wireless medium and to configure frames or packets for communicating over the wireless medium. Communication device 1000 may also include processing circuitry 1006 and memory 1008 arranged to configure the various elements of the communication device to perform the operations described herein. The memory 1008 may be used to store information for configuring the processing circuitry 1006 to perform the operations.

The one or more antennas 1001 utilized by the communication device 1000 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and different channel characteristics that may result between each of the antennas of a receiving station and each of the antennas of a transmitting station. In some MIMO embodiments, the antennas may be separated by up to $1/10$ of a wavelength or more.

Although the communication device 1000 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), and combinations of various hardware and logic circuitry for performing at least the functions described herein. In some embodiments, the functional elements may refer to one or more processes operating on one or more processing elements.

The embodiments described may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the processing circuitry 806 may be configured to receive OFDM communication signals over a multicarrier communication channel in accordance with an OFDMA communication technique. The OFDM signals may comprise a plurality of orthogonal subcarriers. In some broadband multicarrier embodiments, the communication device 1000 may operate as part of a broadband wireless access (BWA) network communication network, such as a Worldwide Interoperability for Microwave Access (Wi-MAX) communication network or a 3GPP Universal Terrestrial Radio Access Network (UTRAN) or a Long-Term-Evolution (LTE) communication network or an LTE-Advanced communication network or a fifth generation (5G) LTE communication network or a high speed downlink/uplink access (HSDPA/HSUPA) communication network, although the scope of the invention is not limited in this respect.

The PHY circuitry 1002 may also be configured to transmit and receive radio frequency electrical signals to communicate directly with one or more separate wireless devices using a Wi-Fi communication channel of a Wi-Fi communication spectrum. The Wi-Fi communication channel may be established by a Wi-Fi network implemented under one of the Institute of Electrical and Electronic Engineers 1002.11 standards, such as the IEEE 802.11-2012 standard published Mar. 29, 2012. The MAC circuitry 1004 may be configured to prepare frames or packets for communicating using IP and a Wi-Fi protocol, such as a protocol established according to the Wi-Fi standard mentioned previously for example.

The processing circuitry 1006 is configured (e.g., by one or a combination of hardware, firmware and software) to initiate transmission of a packetized message using both a Wi-Fi cellular communication channel and a cellular communication channel during the same communication session. In some embodiments, the communication device 1000 may be a UE, and the processing circuitry 1006 initiates transmission of the packetized message to an eNB using both the Wi-Fi communication channel and the cellular communication channel. In some embodiments, the processing circuitry 1006 initiates transmission of the packetized message to a PDN GW using both the Wi-Fi communication channel and the cellular communication channel.

The packetized message includes multiple IP packets. The processing circuitry 1006 indicates in an IP header field of an IP packet that the IP packet format has been changed and includes a packet sequence number. Because the packetized message is communicated using both a cellular channel and a Wi-Fi channel, the EPS bearer is a split EPS bearer. In some embodiments, the indicator of EPS bearer splitting can be included in the DLDC layer shown in the examples of FIGS. 7-9. In some embodiments, the IP header field includes an indicator of EPS bearer splitting to indicate that the IP packet includes a packet sequence number.

Figure 11:
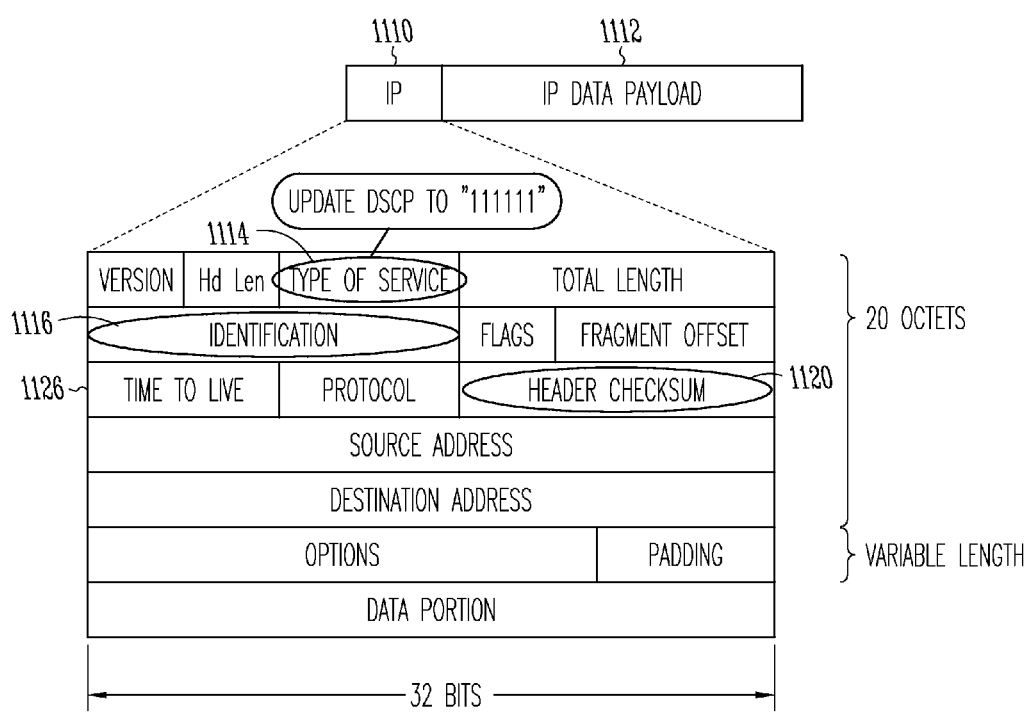
FIG. 11 is a diagram of an example of an internet protocol packet in accordance with some embodiments.

FIG. 11 is a diagram of an example of an IP packet. The IP packet includes an IP packet header 1110 or header portion, and an IP data payload 1112 or data portion. In some embodiments, the indicator of EPS bearer splitting is included in a type of service (ToS) field 1114 of the IP header or a differentiated services (DS) field. In the example shown, the differentiated services code point value (DSCP) is changed to all ones ("111111") as the indicator of EPS bearer splitting. Other reserved values of the DSCP can be used to indicate EPS bearer splitting. In some variations, the indicator of EPS bearer splitting is included in a time to live (TTL) field 1126 of the IP header.

The processing circuitry 1006 also includes the packet sequence numbers in the IP packets. In some embodiments, the packet sequence number is included in the IP header field together with the indicator of EPS bearer splitting. In the example of FIG. 11, the packet sequence number is included in an identification field 1116 of the IP header. The IP protocol may be version 4 (IPv4) and the packet sequence number may be included in the identification field 1116 or a fragment offset field 1118 of the IP header. In some embodiments, the IP protocol is version 6 (IPv6) and the packet sequence number is included in a flow label field of the IP header. If one or both of the indicator of EPS bearer splitting and the packet sequence number are included in the IP header, the header checksum 1120 may be updated.

Figure 12:
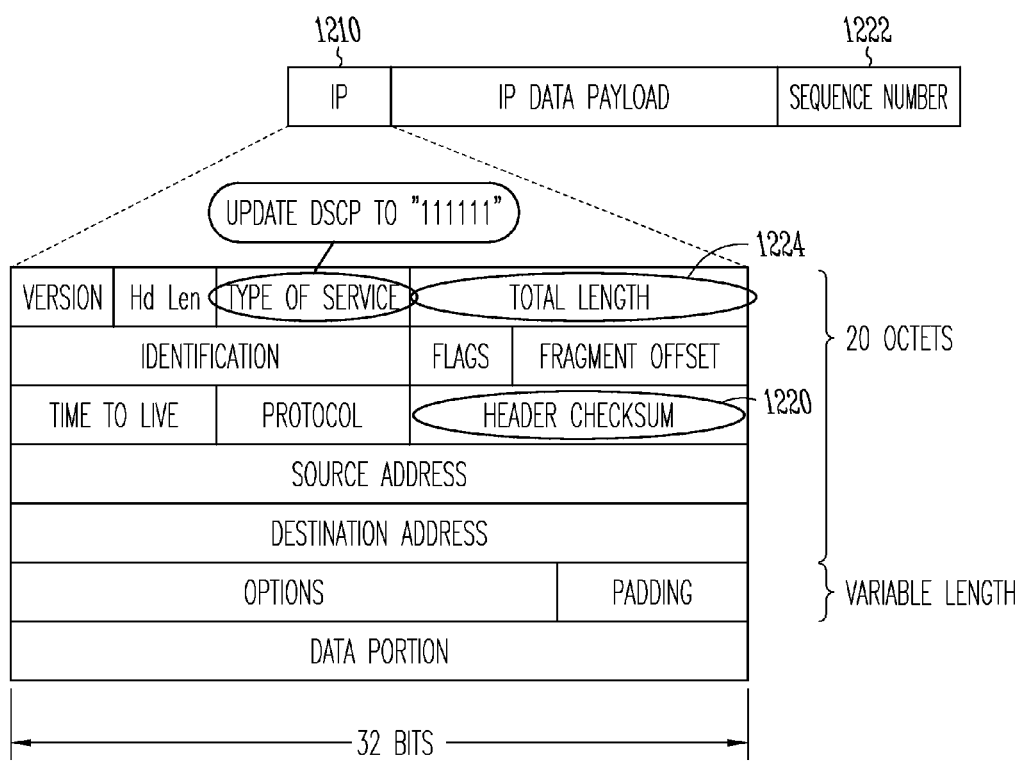
FIG. 12 is a diagram of another example of an internet protocol (IP) packet in accordance with some embodiments.

FIG. 12 is a diagram of another example of an IP packet. The packet includes an IP packet header 1210, and a payload portion. The packet sequence number 1222 is added to the payload portion. The packet sequence number 1222 may be included at the beginning or the end of the IP packet payload. Because the packet sequence number is added to the IP packet the total length field 1224 may be updated when the packet sequence number 1222 is added to the payload portion. The header checksum 1220 may also be updated.

Returning to FIG. 10, the PHY circuitry 1002 also receives a packetized message using both the Wi-Fi cellular communication channel and the cellular communication channel. The processing circuitry 1006 detects that received IP packets include packet sequence numbers, reorders the received IP packets according to the packet sequence numbers, and provides the packetized message in order to a process performable by the communication device. The process may be performable by the processing circuitry 1006 or separate processing circuitry. The processing circuitry may provide the ordered packetized message to a higher protocol layer of the communication device.

In some embodiments, the processing circuitry 1006 decodes an IP header field of an IP packet to determine that the received IP packets include the packet sequence numbers. The IP header field may be included in the IP header field using any of the methods described previously herein. In some embodiments, the processing circuitry 1006 detects an indication of EPS bearer splitting by decoding the IP header field. The processing circuitry 1006 may read the sequence number from an IP header field or from an IP payload. In some embodiments, the processing circuitry 1006 reads a packet sequence number included in an IP header field and resets the IP header field to a specified value when the packet sequence number is read.

The several embodiments described herein provide an increase in communication bandwidth for a radio access network by utilizing available Wi-Fi networks. A single bearer may be split between a cellular communication channel and a Wi-Fi communication channel. The bearer splitting is implemented through a communication protocol that is compatible with legacy u-plane protocols and also with core-based networks.

ADDITIONAL NOTES AND EXAMPLES

Example 1 includes subject matter (such as a communication device) comprising physical layer circuitry configured to transmit and receive radio frequency electrical signals to communicate directly with one or more separate wireless devices via a cellular network and a non-cellular network; and processing circuitry configured to: initiate transmission of a packetized message using a split evolved packet system (EPS) bearer, wherein the split EPS bearer includes a non-cellular communication channel and a cellular communication channel, wherein the packetized message includes a plurality of internet protocol (IP) packets; include an indicator of EPS bearer splitting in an IP header field of an IP packet of the plurality of IP packets; and include packet sequence numbers in the IP packets of the packetized message.

In Example 2, the subject matter of Example 1 optionally includes processing circuitry configured to include the indicator of EPS bearer splitting in at least one of a differentiated services (DS) field, a type of service (ToS) field, or time to live (TTL) field of an IP header of the IP packet of the plurality of IP packets.

In Example 3, the subject matter of one or any combination of Examples 1-2 optionally includes processing circuitry configured to initiate transmission of the packetized message according to a network protocol layer stack that includes an IP layer, and the indicator of EPS bearer splitting is optionally included in a layer below the IP layer.

In Example 4, the subject matter of one or any combination of Examples 1-3 optionally includes processing circuitry configured to include the packet sequence number in the IP header field of an IP packet of the plurality of IP packets.

In Example 5, the subject matter of Example 4 optionally includes processing circuitry configured to include the packet sequence number in at least one of a fragment offset field or an identification field of an internet protocol version 4 (IPv4) IP header.

In Example 6, the subject matter of Example 4 optionally includes processing circuitry is configured to include the packet sequence number in a flow label field of an internet protocol version 6 (IPv6) IP header.

In Example 7, the subject matter of one or any combination of Examples 1-6 optionally includes processing circuitry is configured to include the packet sequence number in a payload portion of the IP packet.

In Example 8, the subject matter if one or any combination of Examples 1-7 is optionally included in user equipment (UE), and wherein the processing circuitry is configured to initiate transmission of the packetized message to at least one of an enhanced node B (eNB) or a packet data network gateway (PDN GW) using the non-cellular communication channel and the cellular communication channel.

In Example 9, the subject matter of one or any combination of Examples 1-7 is optionally included in an eNB or a PDN GW, and wherein the processing circuitry is configured to initiate transmission of the packetized message to UE using the non-cellular communication channel and the cellular communication channel.

In Example 10, the subject matter of one or any combination of Examples 1-7 is optionally is included in at least one of a long term evolution (LTE) cellular device, an LTE-advanced cellular device, and a fifth generation (5G) cellular device.

In Example 11, the subject matter of one or any combination of Examples 1-10 optionally includes one or more antennas electrically connected to the physical layer circuitry.

Example 12 can include subject matter, or can optionally be combined with the subject matter of one or any combination of Examples 1-11 to include such subject matter, such as a computer readable storage medium to store instructions for execution by one or more processors of a wireless communication device of a cellular communication network to perform operations to configure the wireless communication device to: transmit a packetized message using a non-cellular communication channel of a non-cellular communication network and a cellular communication channel of a cellular communication network, wherein the packetized message includes a plurality of internet protocol (IP) packets that include packet sequence numbers; and indicate in an IP header field of an IP packet of the plurality of IP packets that the IP packet includes a packet sequence number.

In Example 13, the subject matter of Example 12 optionally includes instructions that cause the wireless communication device to include the indicator of EPS bearer splitting in at least one of a differentiated services (DS) field, a type of service (ToS) field, or time to live (TTL) field of an IP header of the IP packet of the plurality of IP packets.

In Example 14, the subject matter of one or both of Examples 12 and 13 optionally includes instructions that cause the wireless communication device to transmit the packetized message according to a network protocol layer stack that includes an IP layer, and to include the indicator of EPS bearer splitting in a layer below the IP layer in the network protocol layer stack.

In Example 15, the subject matter of one or any combination of Examples 12-14 optionally includes instructions that cause the wireless communication device to include the packet sequence numbers in the IP header of the IP packets.

In Example 16, the subject matter of Example 15 optionally includes instructions that cause the wireless communication device to include the packet sequence number in at least one of a fragment offset field or an identification field of an internet protocol version 4 (IPv4) IP header.

In Example 17, the subject matter of Example 15 optionally includes instructions that cause the wireless communication device to include the packet sequence number in a flow label field of an internet protocol version 6 (IPv6) IP header.

In Example 18, the subject matter of one or any combination of Examples 12-14 optionally includes instructions that cause the wireless communication device to include the packet sequence number in a payload portion of the IP packet.

In Example 19, the subject matter of one or any combination of Examples 12-18 optionally includes instructions that cause the wireless communication device to transmit an IP packet of the plurality of IP packets using the non-cellular communication channel to an enhanced node B (eNB) of the cellular communication network.

In Example 20, the subject matter of one or any combination of Examples 12-19 optionally includes instructions that cause the wireless communication device to transmit an IP packet of the plurality of IP packets using the non-cellular communication channel to a packet data network gateway (PDN GW) of the cellular communication network.

Example 21 includes subject matter (such as an apparatus), or can optionally be combined with the subject matter of one or any combination of Examples 1-20 to include such subject matter, comprising processing circuitry configured to: initiate transmission of a packetized message using a non-cellular communication channel of a non-cellular communication spectrum and a cellular communication channel of a cellular network, wherein the packetized message includes a plurality of internet protocol (IP) packets; indicate in an IP header field of an IP packet of the plurality of IP packets that the IP packet includes a packet sequence number; and include the packet sequence numbers in the IP packets.

In Example 22, the subject matter of Example 21 optionally includes processing circuitry configured to include the packet sequence numbers in the IP headers of the IP packets.

In Example 23, the subject matter of Example 21 optionally includes processing circuitry configured to include the packet sequence number in data payloads of the IP packets.

In Example 24, the subject matter of one or any combination of Examples 21-23 is optionally included in in user equipment device (UE) of the cellular network.

In Example 25, the subject matter of one or any combination of Examples 21-23 is optionally included in a packet data network gateway (PDN GW) device of the cellular network.

Example 26 includes subject matter (such as a communication device), or can optionally be combined with the subject matter of one or any combination of Examples 1-25 to include such subject matter, comprising physical layer circuitry configured to transmit and receive radio frequency electrical signals to communicate directly with one or more separate wireless devices via a cellular network and a non-cellular network, including to receive a packetized message that includes a plurality of IP packets using a non-cellular communication channel and a cellular communication channel; and processing circuitry configured to: detect that received IP packets include packet sequence numbers; reorder the received IP packets according to the packet sequence numbers; and provide the ordered packetized message to a process performable by the communication device.

In Example 27, the subject matter of Example 26 optionally includes processing circuitry configured to decode an indicator of EPS bearer splitting included in at least one of in at least one of a differentiated services (DS) field, a type of service (ToS) field, or time to live (TTL) field of an IP header of the IP packet of the plurality of IP packets.

In Example 28, the subject matter of one or both of Examples 26 and 27 optionally includes processing circuitry configured to receive the packetized message according to a network protocol layer stack that includes an IP layer, and decode an indicator of EPS bearer splitting included in a layer below the IP layer in the network protocol layer stack.

In Example 29, the subject matter of one or any combination of Examples 26-28 optionally includes processing circuitry configured to read a packet sequence number included in an IP header field of a received IP packet and reset the IP header field to a specified value.

In Example 30, the subject matter of one or any combination of Examples 26-29 is optionally included in one of user equipment (UE), an enhanced node B (eNB), or a packet data network gateway (PDN GW) of the cellular network.

In Example 31, the subject matter of one or any combination of Examples 26-30 is optionally included at least one of a long term evolution (LTE) cellular device, an LTE-advanced cellular device, and a fifth generation (5G) cellular device.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A communication device comprising:
   physical layer circuitry configured to transmit and receive radio frequency electrical signals to communicate directly with one or more separate wireless devices via a cellular network and a non-cellular network; and
   processing circuitry configured to:
   initiate transmission of a packetized message using a split evolved packet system (EPS) bearer, wherein the split EPS bearer includes a non-cellular communication channel and a cellular communication channel, wherein the packetized message includes a plurality of internet protocol (IP) packets;
   include an indicator of EPS bearer splitting in an IP header field of an IP packet of the plurality of IP packets; and
   include packet sequence numbers in the IP packets of the packetized message, wherein a packet sequence number indicates a place in an original transmission where an individual packet belongs.

2. The communication of claim 1, wherein the processing circuitry is configured to include the indicator of EPS bearer splitting in at least one of a differentiated services (DS) field, a type of service (ToS) field, or time to live (TTL) field of an IP header of the IP packet of the plurality of IP packets.

3. The communication device of claim 1, wherein the processing circuitry is configured to initiate transmission of the packetized message according to a network protocol layer stack that includes an IP layer, and includes the indicator of EPS bearer splitting in a layer below the IP layer.

4. The communication device of claim 1, wherein the processing circuitry is configured to include the packet sequence number in the IP header field of an IP packet of the plurality of IP packets.

5. The communication device of claim 1, wherein the processing circuitry is configured to include the packet sequence number in at least one of a fragment offset field or an identification field of an internet protocol version 4 (IPv4) IP header.

6. The communication device of claim 1, wherein the processing circuitry is configured to include the packet sequence number in a flow label field of an internet protocol version 6 (IPv6) IP header.

7. The communication device of claim 1, wherein the processing circuitry is configured to include the packet sequence number in a payload portion of the IP packet.

8. The communication device of claim 1, wherein the communication device is user equipment (UE), and wherein the processing circuitry is configured to initiate transmission of the packetized message to at least one of an enhanced node B (eNB) or a packet data network gateway (PDN GW) using the non-cellular communication channel and the cellular communication channel.

9. The communication device of claim 1, wherein the communication device is one of an eNB or a PDN GW, and wherein the processing circuitry is configured to initiate transmission of the packetized message to UE using the non-cellular communication channel and the cellular communication channel.

10. The communication device of claim 1, wherein the wireless communication device includes at least one of a long term evolution (LTE) cellular device, an LTE-advanced cellular device, and a fifth generation (5G) cellular device.

11. The communication device of clam 1, including one or more antennas electrically connected the physical layer circuitry.

12. An apparatus of a device for operation in a cellular network, the apparatus comprising processing circuitry configured to:
  implement a user plane (u-plane) protocol stack in the communication device, wherein the u-plane includes packet data convergence protocol PDCP layer, a wireless local area network tunneling protocol (WLTP) layer, and a data link data convergence (DLDC) layer above the PDCP layer and the WLTP layers;
  initiate transmission of a packetized message using a split evolved packet system (EPS) bearer, wherein the split EPS bearer includes a non-cellular communication channel and a cellular communication channel, wherein the packetized message includes a plurality of internet protocol (IP) packets; and
  receive a packetized message using a split EPS bearer; and wherein the DLDC layer is configured to perform operations of EPS bearer splitting including:
    include an indicator of EPS bearer splitting in an IP header field of an IP packet of the plurality of IP packets;
    include packet sequence numbers in the IP packets of the packetized message,
    wherein a packet sequence number indicates a place in an original transmission where an individual packet belongs; and
    decode an indicator of EPS bearer splitting in the IP header field to determine that the received IP packets include packet sequence numbers.

13. The apparatus of claim 12, wherein the processing circuitry is configured to include the packet sequence numbers of the packetized message in the IP headers of the IP packets.

14. The apparatus of claim 12, wherein the processing circuitry is configured to include the packet sequence number of the packetized message in data payloads of the IP packets.

15. The apparatus of claim 12, wherein the apparatus is included in user equipment device (UE) of the cellular network.

16. The apparatus of claim 12, wherein the apparatus is included a packet data network gateway (PDN GW) device of the cellular network.

17. A communication device comprising:
  physical layer circuitry configured to transmit and receive radio frequency electrical signals to communicate directly with one or more separate wireless devices via a cellular network and a non-cellular network, including to receive a packetized message using a split evolved packet system (EPS) bearer, wherein the split EPS bearer includes a non-cellular communication channel and a cellular communication channel and IP packets of the packetized message are received via both channels of the split EPS bearer; and
  processing circuitry configured to:
    decode an indicator of EPS bearer splitting in the IP header field to determine that the received IP packets include packet sequence numbers;
    read a packet sequence number included in an IP header field of a received IP packet and reset the IP header field to a specified value;
    reorder the received IP packets according to the packet sequence numbers; and
    provide the ordered packetized message to a process performable by the communication device.

18. The communication device of claim 17, wherein the processing circuitry is configured to decode an indicator of EPS bearer splitting included in at least one of in at least one of a differentiated services (DS) field, a type of service (ToS) field, or time to live (TTL) field of an IP header of the IP packet of the plurality of IP packets.

19. The communication device of claim 17, wherein the processing circuitry is configured to receive the packetized message according to a network protocol layer stack that includes an IP layer, and decode an indicator of EPS bearer splitting included in a layer below the IP layer in the network protocol layer stack.

20. The communication device of claim 17, wherein the wireless communication device includes at least one of a long term evolution (LTE) cellular device, an LTE-advanced cellular device, and a fifth generation (5G) cellular device.

21. A non-transitory computer readable storage medium including instructions that, when executed by hardware processing circuitry of a wireless communication device of a cellular communication network, cause the wireless communication device to:
  implement a user plane (u-plane) protocol stack in the communication device, wherein the u-plane includes packet data convergence protocol PDCP layer, a wireless local area network tunneling protocol (WLTP) layer, and a data link data convergence (DLDC) layer above the PDCP layer and the WLTP layers; and
  transmit a packetized message using a split evolved packet system (EPS) bearer, wherein the split EPS bearer includes a non-cellular communication channel and a cellular communication channel, wherein the packetized message includes a plurality of internet protocol (IP) packets; and
  include, using the DLDC layer, an indicator of EPS bearer splitting in an IP header field of an IP packet of the plurality of IP packets; and include packet sequence numbers in the IP packets of the packetized, wherein a packet sequence number indicates a place in an original transmission where an individual packet belongs.

22. The non-transitory computer readable storage medium of claim 21, including instructions that cause the wireless communication device to include the packet sequence numbers in the IP header of the IP packets.

23. The non-transitory computer readable storage medium of claim 21, including instructions that cause the wireless communication device to include the indicator of EPS bearer splitting in at least one of a differentiated services (DS) field, a type of service (ToS) field, or time to live (TTL) field of an IP header of the IP packet of the plurality of IP packets.

24. The non-transitory computer readable storage medium of claim 21, including instructions that cause the wireless communication device to include the packet sequence number in a payload portion of the IP packet.

* * * * *

UNITED STATES PATENT AND TRADEMARK OFFICE
CERTIFICATE OF CORRECTION

PATENT NO. : 10,045,257 B2  
APPLICATION NO. : 15/121709  
DATED : August 7, 2018  
INVENTOR(S) : Zhu et al.

Page 1 of 1

It is certified that error appears in the above-identified patent and that said Letters Patent is hereby corrected as shown below:

In the Claims

In Column 12, Line 28, in Claim 2, after "communication", insert --device--

In Column 12, Line 37, in Claim 3, delete "hearer" and insert --bearer-- therefor In Column 13, Line 5, in Claim 11, delete "clam 1," and insert --claim 1,-- therefor In Column 13, Line 6, in Claim 11, after "connected", insert --to--

In Column 13, Line 51, in Claim 16, after "included", insert --in--

Signed and Sealed this  
Eleventh Day of June, 2019

Andrei Iancu  
*Director of the United States Patent and Trademark Office*